Nov. 4, 1958 L. DE MARCO 2,859,027
MOTOR GOVERNOR
Filed Jan. 24, 1956 2 Sheets-Sheet 1
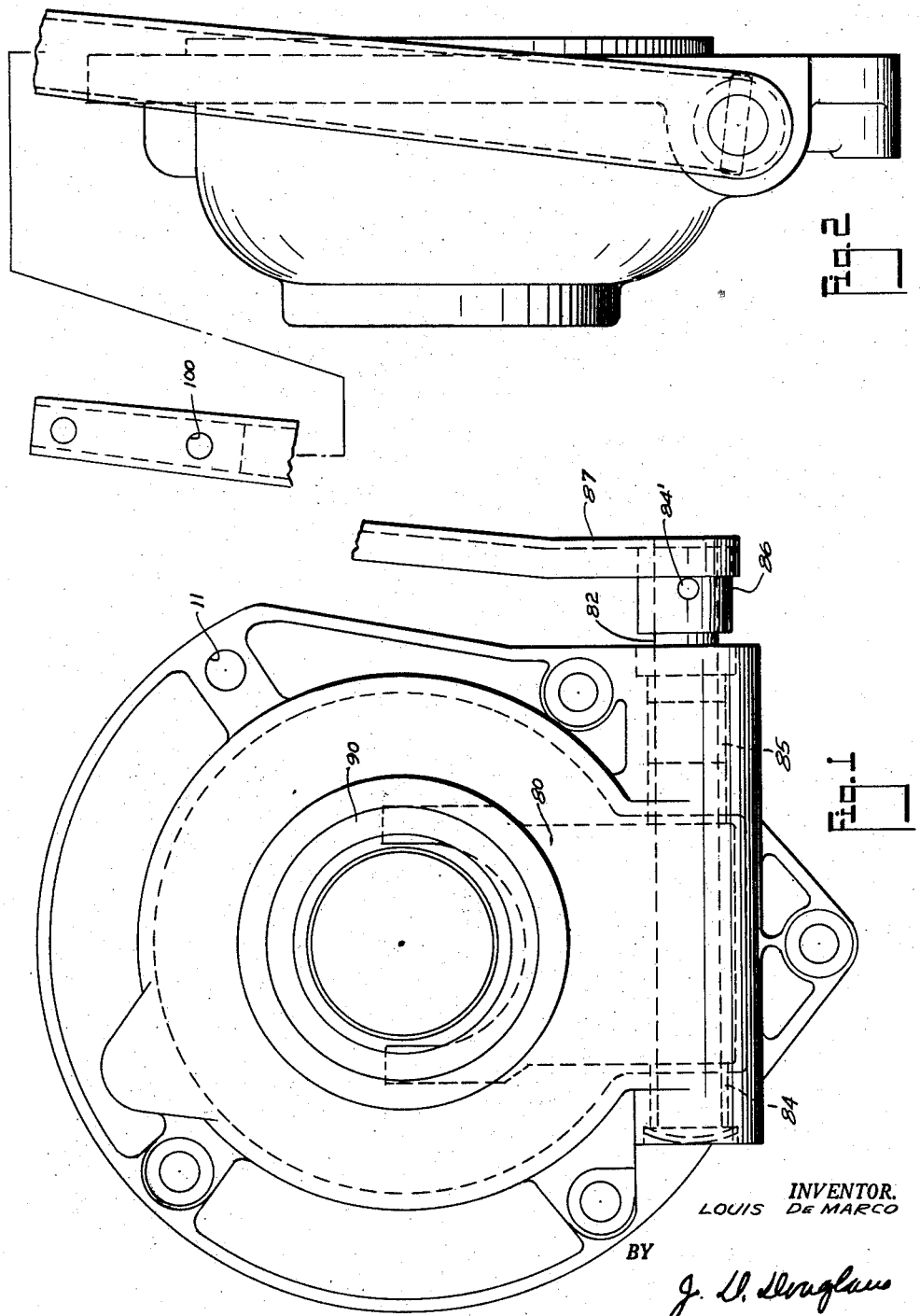
INVENTOR.
LOUIS DE MARCO
BY
*J. D. Douglass*
HIS ATTORNEY Nov. 4, 1958  L. DE MARCO  2,859,027
MOTOR GOVERNOR
Filed Jan. 24, 1956  2 Sheets-Sheet 2
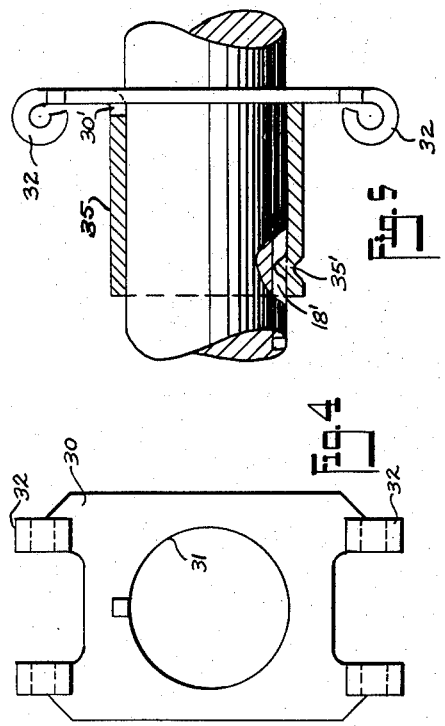
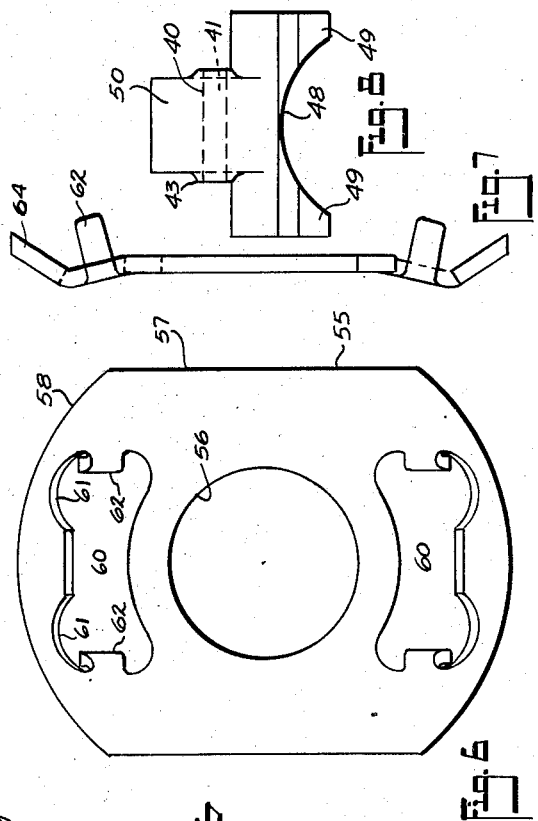
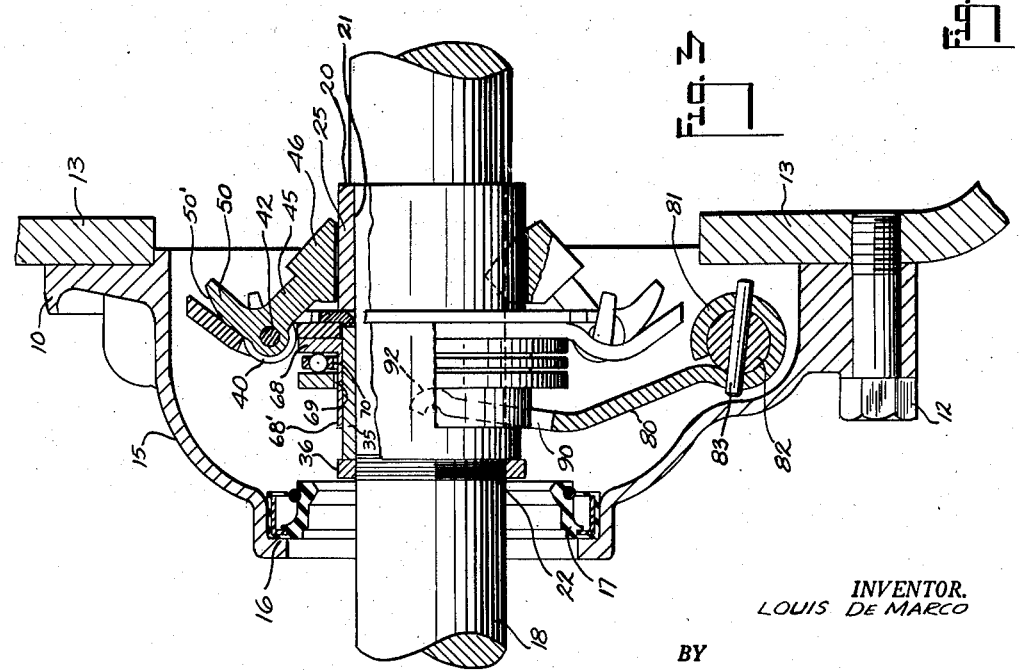
INVENTOR.
LOUIS DE MARCO
BY
*J. D. Douglas*
HIS ATTORNEY 2,859,027

MOTOR GOVERNOR

Louis De Marco, East Cleveland, Ohio

Application January 24, 1956, Serial No. 561,095

7 Claims. (Cl. 264—15)

This invention relates to improvements in governors and more particularly governors that are useful with internal combustion engines. The present invention is an improvement in the type of governor shown in my Patent No. 2,464,853 of March 22, 1949.

Although the governor illustrated in the aforesaid patent is highly efficacious and satisfactory there are certain features which may be considered undesirable from the manufacturing standpoint, that the present invention overcomes.

By the structure of my present invention I am able to make a governor that is economical in construction because it may be constructed from stampings and a wide latitude of dimensional deviations may be tolerated without having a deleterious effect upon its operation.

Another advantage of this structure is that it may be installed quickly and easily without interference with the other operating parts on an engine and utilizes a minimum of space. When installed it becomes, to all intents and purposes, an integral part of the engine rather than an appurtenance thereto.

Still other advantages of the invention and the invention itself will become apparent from the following description of an embodiment thereof which is illustrated by the accompanying drawings.

In the drawings:

Fig. 1 is a front elevational view of the device with certain otherwise hidden parts shown by dashed lines;

Fig. 2 is a side elevational view thereof;

Fig. 3 is a vertical medial sectional view with certain parts shown in elevation and showing a portion of the crank case and a fragment of a crankshaft to which it is attached;

Fig. 4 is a front elevational view of a weight carrier or thrust plate;

Fig. 5 is a side elevational view of the weight carrier positioned on the shaft and coupled to a sleeve on the shaft which is broken away and shown in section;

Fig. 6 is a front elevational view of a slider and cam plate;

Fig. 7 is a side elevational view thereof; and

Fig. 8 is an end view of a governor weight.

Briefly, the invention includes a housing adapted to surround the forward end of a crankshaft and to be bolted to the engine housing and/or crankcase. A thrust plate is secured to the crankshaft and carries two or more centrifugally operated weights which have cam surfaces that cooperated with a slide plate to slide the slide plate which in turn actuates a yoke connected to a lever extending exteriorly of the housing and arranged to be connected to the control valve of the carburetor.

More specifically, the housing includes a flange portion 10 provided with apertured bosses 11 arranged to receive studs 12 which extend through the bosses and are threaded into the crankcase or engine housing 13 or both. Extending outwardly from the flange is a bulbous housing 15 within which the operating mechanism is disposed. The forward end of the housing terminates in an annular flange 16 carrying any suitable type of oil seal illustrated generally at 17 for oil sealing engagement with the crankshaft 18.

As is customary, the crankshaft is usually provided with a shoulder 20 outwardly of which there is a portion of reduced diameter 21 and which is provided with a threaded portion 22 spaced from the shoulder 20. Seated on the shaft and abutting the shoulder 20 is a sleeve 25. Surrounding the shaft is a weight carrier or thrust plate which may comprise a generally rectangular stamping, Figs. 4 and 5, providing a body 30 having a central opening 31 preferably of the same diameter as the shaft. On opposite ends the body is provided with pairs of diametrically opposite outwardly extending pivot pin supporting ears 32 which are formed by curling over tongues integral with the body. Each of the ears of each pair is in spaced axial alignment with each other and are preferably so formed that the openings are to one side of the body as illustrated. Normally these ears are of such a size that the pivot pins for the weights are held in by a press fit. The plate is secured against the sleeve 25 by a sleeve 35 held in place by a nut 36 on the threaded portion 22. It will be seen that when the nut is tightened the sleeve 35 is forced against the body of the plate and the plate in turn forced against the sleeve 25 which cannot move because it abuts the shoulder 20 on the crankshaft. Therefore, to all intents and purposes, the weight carrier or thrust plate becomes substantially an integral part of the crankshaft. If desired it may also be keyed to the crankshaft. In this instance the sleeve 35 is provided with an inwardly extending projection 35' which protrudes into a groove 18' on the crankshaft. In addition the plate 30 is provided with a lug 30' which extends into a notch in the end of the sleeve 35.

The weight carrier pivotally supports the governor weights. Although two such weights are illustrated it will be appreciated that the number of weights may be varied but that preferably at least two should be used. If three or more weights are used the support plate would be provided with an equal number of pairs of ears. The governor weights each comprise a boss 40 having a bore 41, Fig. 8, for receiving a pin 42 which extends through the bore and is journalled in a pair of the ears 32 of the weight carrier. Preferably the boss is provided with raised portions 43 adjacent the ends of the bore which act as thrust means for engagement with the inner surfaces of the ears 32 to provide for greater freedom of movement of the weight carrier.

The main body of the weight is arranged to extend closely adjacent to the crankshaft and is supported by a stem 45 which extends inwardly toward the crankshaft, during a state of rest, at an angle of approximately 45°. The weight 46 may take various formations but preferably comprises a body of a considerable mass. One face of the body which faces toward the crankshaft, is provided with a hollow semi-cylindrical contour 48 that enables the weight to extend close to the crankshaft and providing projecting sides 49 which partially surround the crankshaft or sleeve 25. Each of the governor weights is provided with a slider operator which comprises a projection 50 extending outwardly from the boss 40 at an angle of approximately 90° to the stem 45 and which is provided with a curved cam surface 50'. As will hereinafter appear the cam surface has a conformation such that when the governor weight pivots about its pivot it provides a rolling contact, minimizing friction, with a slider 55.

The slider, Figs. 6 and 7, comprise a central body part 55 having a central opening 56 to provide an easy sliding fit with the sleeve 35. The body is provided with straight side edges 57 and curved ends 58. It could be of circular form if desired. It will be noted that body parts spaced from the central opening are bent outwardly and are then bent in the opposite direction. On opposite sides of the opening and spaced therefrom and in the outwardly bent parts are provided diametrically opposed openings 60 each of which has enlarged ends 61 which permit the ears 32 on the weight carrier to extend therethrough when the device is at a state of rest. At the ends of each of the openings 60 there are provided oppositely disposed lugs 62 which extend normal to the face of the plate, opposite to the ears 32 and the openings therein. The ears are arranged to provide driving engagement of the slider by the thrust plate and to prevent displacement longitudinally of the pivot pins 42 should they become loose in the ears. These lugs are of sufficient length that they always have a portion extending across the ears and the pivot pins as the plate is slid longitudinally on the sleeve 35 by the action of the weights.

The slanting ends of the plates are bent at an angle to provide cam engaging surfaces 64 which extend in opposition to the cam faces 50 on the governor weights. as stated, upon rotation of the device along with the crankshaft the speed of rotation causes the weights to move outward and the cam surfaces 50 of the weights engage with the surfaces 64 to push the slider on the sleeve 25.

Adjacent to the slider plate and outwardly therefrom is a thrust bearing comprising inner and outer races 68 and 69 with balls 70 therebetween. The inner race 68 may have, integral therewith a sleeve portion 68' which is in slidable engagement with the shaft and extends through the bearing retainer and the outer race along the shaft.

Movement of the slide, in turn moves the thrust bearing, which engages with a fork carried by a shaft that operates a lever exteriorly of the housing. The fork comprises a yoke or body 80 having an eye 81 disposed on a shaft 82 and pinned thereon by a pin 83. The shaft extends transversely of the housing at the lower portion and is journalled in bearings 84 at one end and 85 at the other end. It extends exteriorly of the housing at 83 and has pinned thereon, by a pin 84', a lever 87 which has a boss 86 surrounding the shaft. The yoke 80 is provided with a bifurcated end which provides a pair of arms 90 disposed on opposite sides of the shaft and the sleeve 35. The arms are provided with curved thrust bearing ends 92 which ride on the outer race 69.

In operation when the crankshaft revolves it carries with it the weight carrying plate 30 causing the bodies 46 of the weights to swing outwardly due to the centrifugal force. The cam surfaces 50 of the weights roll on the slider surfaces 64 pushing the slider and the thrust bearing to the left as shown in Fig. 3. The lugs 62 on the slider engage with the base plate 30 and maintain the two in alignment providing a driving engagement therebetween. The outer race of the thrust bearing being engaged with the curved ends 92 of the yoke 80 moves the yoke and it rotates the shaft 82 moving the arm 87 to the left as viewed in Fig. 2. The arm is provided with openings 100 which may receive the end of a connecting rod which is connected to the throttle valve of the carburetor of the engine to cause the closing of that valve as the speed increases. It will be appreciated that this arm is connected in the usual manner to the throttle valve.

It will thus be seen that the housing may be secured to the end of the crankcase and does not take up a considerable amount of room. Preferably the weights may be made of cast material although they could be fabricated from stampings if desired. The weight supporting plate, the slide plate and the yoke may be made from stampings, which, as appreciated, are extremely cheap to fabricate. It will also be apparent that the nesting engagement of the weight support plate and slider plate permit a relatively thin or narrow assembly in the direction longitudinally of the crankshaft, conserving space. Inasmuch as the cam engaging surfaces on the slider plate are substantially in alignment with the pivot pin for the weights, a very efficient engagement of the weight cams with this plate is realized and the operation becomes more effective. It can also be seen that because of the lugs on the slider plate which extend opposite to the pivot pins that a very simple assembly is realized in that no special fastening means need be provided for the pivot pins which although they will normally be held in by a press fit cannot move out of their journals should they become loose during operation. Since the slider plate has a relatively thin bearing surface in engagement with the sleeve 35 and can have a loose fit therewith, there is a reduction in the frictional engagement which increases the sensitivity and efficiency of the operation of the device.

Having thus described my invention I am aware that numerous and extensive departures may be made therefrom without departing from the spirit or scope of the invention as is defined in the appended claims.

I claim:

1. A device of the class described including a rotary shaft, support member coupled to said shaft to rotate therewith and extending transversely from said shaft, pivot means carried by said support member, weights pivotally carried by said pivot means, a slidable member slidably journalled on the shaft and having surfaces engaged by said weight means to move said member longitudinally of the shaft and said slidable member having ing driving lugs extending across the opposite ends of said pivot means which retain said pivot means on the support member and couple the slidable member to the support member for rotation together.

2. A device of the class described including a rotary shaft, support member coupled to said shaft to rotate therewith and extending transversely from said shaft, pivot pins carried by said support member, weights pivotally carried by said pivot pins, a slidable member slidably journalled on the shaft and having surfaces engaged by said weight means to move said slidable member longitudinally of the shaft and said slidable member having portions extending across the opposite ends of said pivot pins which hold said pivot pins on the support member and couple the slidable member to the support member for rotation therewith.

3. A device of the class described including a rotary shaft, a plate secured to the shaft, pivot pins carried by said plate outwardly from the shaft, weights pivotally carried by said pivot pins and having portions normally extending alongside the shaft inwardly of the pivot pins, cam surfaces formed on said weights outwardly of the pivot pins, a slidable member slidably disposed on the shaft adjacent the plate and having cam surfaces outwardly of said pivot pins positioned to be engaged by the cam surfaces on said weights, and said slidable member having lugs extending across the opposite ends of said pivot pins for driven engagement by said plate and to prevent accidental displacement of said pivot pins from the plate.

4. A device as described in claim 3 wherein the cam surfaces on the slidable member are disposed in planes inclined to a plane normal to the shaft axis and substantially opposite to a plane through the pivot pins for the weights.

5. A device of the class described including a rotatable shaft, a weight support plate secured to and rotatable with the shaft, said weight support plate being provided with radially extending arms having pivot journals at their ends, said journals being offset to one side of said support plate, pivot pins disposed in said journals, weight members pivotally journalled on said pivot pins and comprising weights normally extending adjacent to the shaft and having angularly extending arms formed with cam surfaces extending outwardly from the shaft and said pivot pins, a slidable plate slidably journalled on said shaft and including a central body portion disposed adjacent said support plate, said slidable plate being provided with openings adjacent said pivot journals to receive said pivot journals, stop means formed on said slidable plate extending across the opposite ends of said pivot pins for holding said pivot pins in said support plate and for providing driving engagement between the support plate and the slidable plate, and cam engaging surfaces on said slidable plate each comprising an inclined surface extending angularly outward from the shaft toward the support plate.

6. A device of the class described including a rotatable shaft, a weight support plate secured to and rotatable with the shaft, said weight support plate being provided with radially extending arms having pivot journals at their ends, said journals being offset in a plane to one side of said support plate, pivot pins disposed in said journals, weight members pivotally journalled on said pivot pins and comprising weights extending adjacent to the shaft when the shaft is at rest and having angularly extending arms formed with cam surfaces extending outward from the shaft and pivot pins, a slidable plate slidably journalled on said shaft and including a central body portion disposed adjacent said support plate, said slidable plate being provided with openings adjacent said pivot journals to receive said pivot journals, lugs formed on said slidable plate extending across the opposite ends of said pivot pins for holding said pivot pins in said support plate and for providing driving engagement between the support plate and the slidable plate, and cam engaging surfaces on said slidable plate each comprising an inclined surface extending angularly outward from the shaft toward the support plate, said slidable plate and support plate being in nested engagement with each other when the shaft is at rest.

7. A governor for attachment to a motor having a housing and a rotatable shaft comprising a thrust plate secured to and rotatable with said shaft formed with pairs of spaced aligned eyes disposed outwardly of the shaft on opposite sides thereof and at one side of the thrust plate, pivot pins carried in said eyes to one side of the plane of said thrust plate, weight levers pivotally journalled on said pivot pins between said eyes and having weight portions extending inwardly of the pivot pins toward the shaft and partially surrounding the shaft on opposite sides thereof when the shaft is at rest, cam arms on said weight levers extending outwardly of the pivot pins and having curved cam surfaces, a cam plate slidably journalled on the shaft having a central body for nesting engagement with the thrust plate and having portions at diametrically opposite ends of the body offset away from the plane of the thrust plate and formed with openings through which the eyes on the thrust plate may extend, ears on said cam plate extending across the ends of the eyes on the thrust plate and the ends of said pivot pins, the length of the ears being such as to always extend across the ends of said pivot pins and engageable with said pivot pins to retain said pivot pins in position in said eyes and said weight levers and to couple the cam plate to the thrust plate for rotation together, the ends of said cam plate being provided with portions extending toward the thrust plate and having inclined cam surfaces opposite to the cam surfaces on said weight levers, said cam surfaces on the weight levers being formed to have rolling engagement with the cam surfaces on the cam plate, and said cam surfaces on the cam plate extending beyond a plane through the pivot pins and toward the thrust plate.

References Cited in the file of this patent

UNITED STATES PATENTS

| 2,229,681 | Sorensen | Jan. 28, 1941 |
| 2,305,093 | Leflar et al. | Dec. 15, 1942 |
| 2,464,853 | De Marco | Mar. 22, 1949 |

FOREIGN PATENTS

| 732,168 | Great Britain | June 22, 1955 |